No. 895,192. PATENTED AUG. 4, 1908.
J. F. PLACE.
APPARATUS FOR LIQUEFYING AIR.
APPLICATION FILED AUG. 24, 1906.

WITNESSES:

INVENTOR

UNITED STATES PATENT OFFICE.

JAMES F. PLACE, OF GLENRIDGE, NEW JERSEY, ASSIGNOR TO AMERICAN AIR LIQUEFYING CO., A CORPORATION OF NEW YORK.

APPARATUS FOR LIQUEFYING AIR.

No. 895,192.   Specification of Letters Patent.   Patented Aug. 4, 1908.

Application filed August 24, 1906. Serial No. 331,918.

*To all whom it may concern:*

Be it known that I, JAMES F. PLACE, a citizen of the United States, and a resident of Glenridge, in the county of Essex and State of New Jersey, have invented certain new and useful Improvements in Apparatus for Liquefying Air, of which the following is a specification.

This invention relates to improvements in mechanism or apparatus for liquefying atmospheric air. It is equally as applicable to liquefying any other gases or gaseous mixtures.

My system also involves partial separation, or fractional distillation as well as liquefaction.

The object of the invention is to produce liquid air at a less cost than heretofore, so that it and its constituent gases, oxygen and nitrogen, may be used commercially in the arts and industries. This object I attain in the manner and by the mechanism hereinafter described, reference being had to the accompanying drawings, in which—

Similar reference marks refer to similar parts throughout the several drawings.

Figure 1:
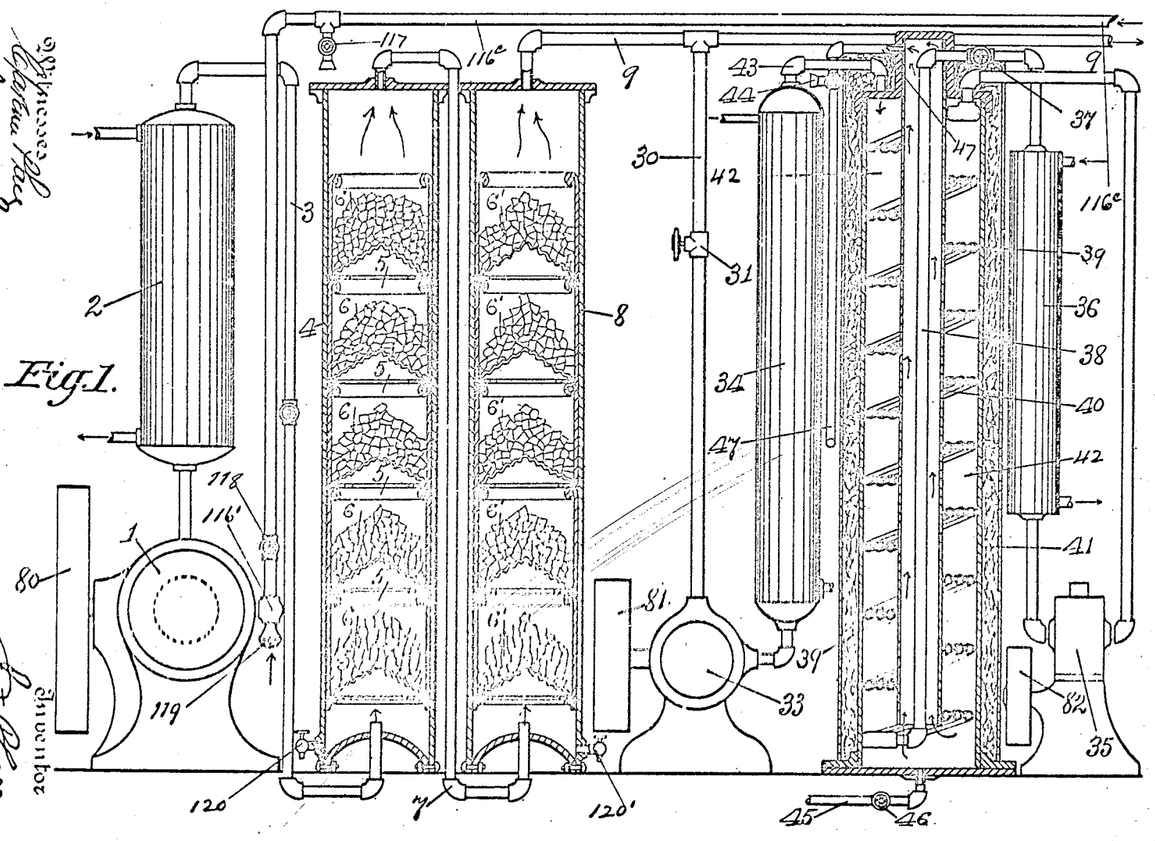
Figure 1 is a general view, partly in vertical section, of the mechanism I employ for compressing, cooling and drying the air, preparatory to liquefaction.
Figure 7:
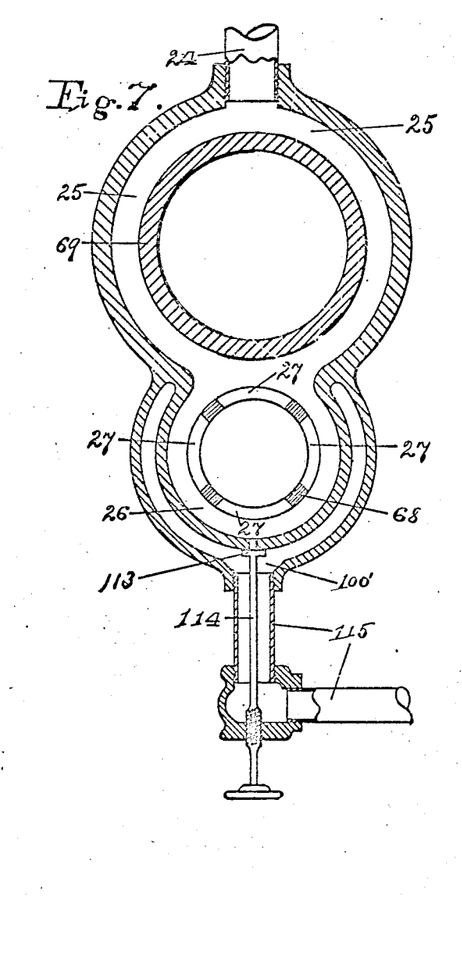
Fig. 7 is a transverse vertical section of the engine cylinder and valve chamber, through the line *a a* on Fig. 3.

In Fig. 1, I show at 1 the main air compressor by which I propose to compress the air to about 180 lbs. gage. At 2 is shown an ordinary water cooler for removing the heat of compression. The compressed air is passed thence through the pipe 3 into the calcium chlorid drum 4, where it passes up through the several baskets 5, and is brought in contact with charges of calcium chlorid 6. This process absorbs considerable of the moisture in the compressed air. From here the air is passed through the pipe 7 into the caustic potash drum 8, and is brought in contact with the caustic potash charges 9, in a similar manner as in the drum 4. This caustic potash removes more of the moisture, and absorbs all of the carbonic acid gas ($CO_2$) in the air, so that as it passes into pipe 9, it may be considered practically dry. I have run an air expansion engine continuously with air subjected to the treatment of passing through calcium chlorid and caustic potash in this manner without further drying, and never experienced any trouble from frost. The air usually showed by the hygrometer but about 13% saturation, which at a pressure of 180 lbs. is very small. From pipe 9 the air passes into the counter-current interchanger (see Fig. 2). This interchanger is preferably made in the following manner: The pipe 9 delivers to the three smaller helical copper tubes 10, which pass down the insulated drum 11, and then deliver to the transverse pipe 12, which connects with the helical coil 13 in the insulated drum 14, and thence through the transverse pipe 15 to the helical coil 16 in the insulated drum 17. The coils have in the center of each the dead-air drums 18, 19 and 20, respectively; so that the three tubes forming the helical coils 10, 13 and 16 respectively, just fill the space left in the drums 11, 14 and 17, leaving the helical passages 21, 22 and 23, which carry back the exhaust and expanded air from the engine, and which will be referred to later on. The compressed air as it leaves the helical coil 16 (Fig. 2) passes into the pipe 24 and through the passage 25 around the engine 32 (see Figs. 3 and 7), to the valve chamber 26. Here it passes inside the main valve (68) through the oblong apertures 27, when it is delivered to the engine through the ports 28 or 28', and cut off at such portion of the stroke as desired by the cut-off valves 29 and 29'.

The expansion engine 32 consists of preferably the iron cylinder and cylindrical valve chamber as shown, the cylinder being lined with a bushing 69, of steel or other suitable metal; in this way the annular port 25 (see Fig. 7) around the cylinder to the valve chamber, is formed. As for the piston, I make the interior (collars 71 and 71') of bronze, and cover or inclose the same with the parts 72 and 72' and 73, made of wood or fiber or some other suitable non-conducting material, held together by the bolts 74. The packings 75 are preferably of leather.

Figure 8:
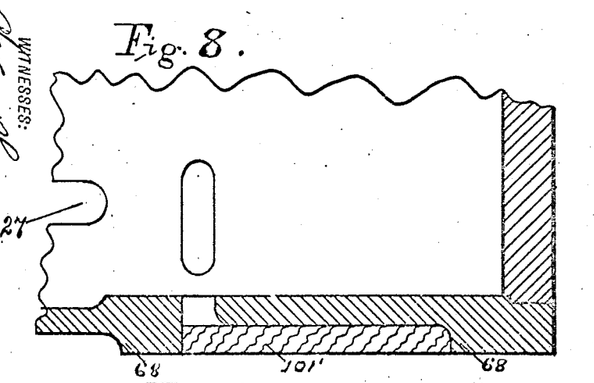
Figs. 8 and 9 are sectional views showing the shoes or "slippers" of wood or other suitable material to take the weight of valve and avoid friction, the latter being a transverse section of valve on the line *c c* of Fig. 3.
Figure 9:
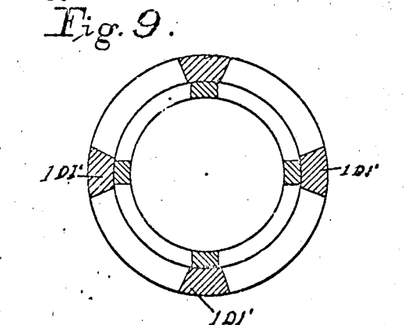

The valve 68 is preferably made of cast iron or bronze-aluminum alloy of the balanced piston type without expansion rings, and with the cut-off valves 29 and 29' operating inside of same. To reduce friction, I use slippers or shoes 101 and 101' which take the weight of valve (see Figs. 8 and 9). These slippers are made preferably of strips of close-grained hard wood, or any other suitable non-conducting material which can be used without lubrication and will run with minimum friction. The long annular ports 28 and 28' enable me to use the inner edges 76, 76' for cutting off, and in this way the main valve and cut-off valves move at all times in opposite directions, thus insuring a sharp cut-off without throttling, which is very essential in an air expansion engine. The exhaust is over the ends of the main valve into the chambers 100 at each end and 100' below the valve chamber, which connects with and delivers to the conduit 61.

Figure 3:
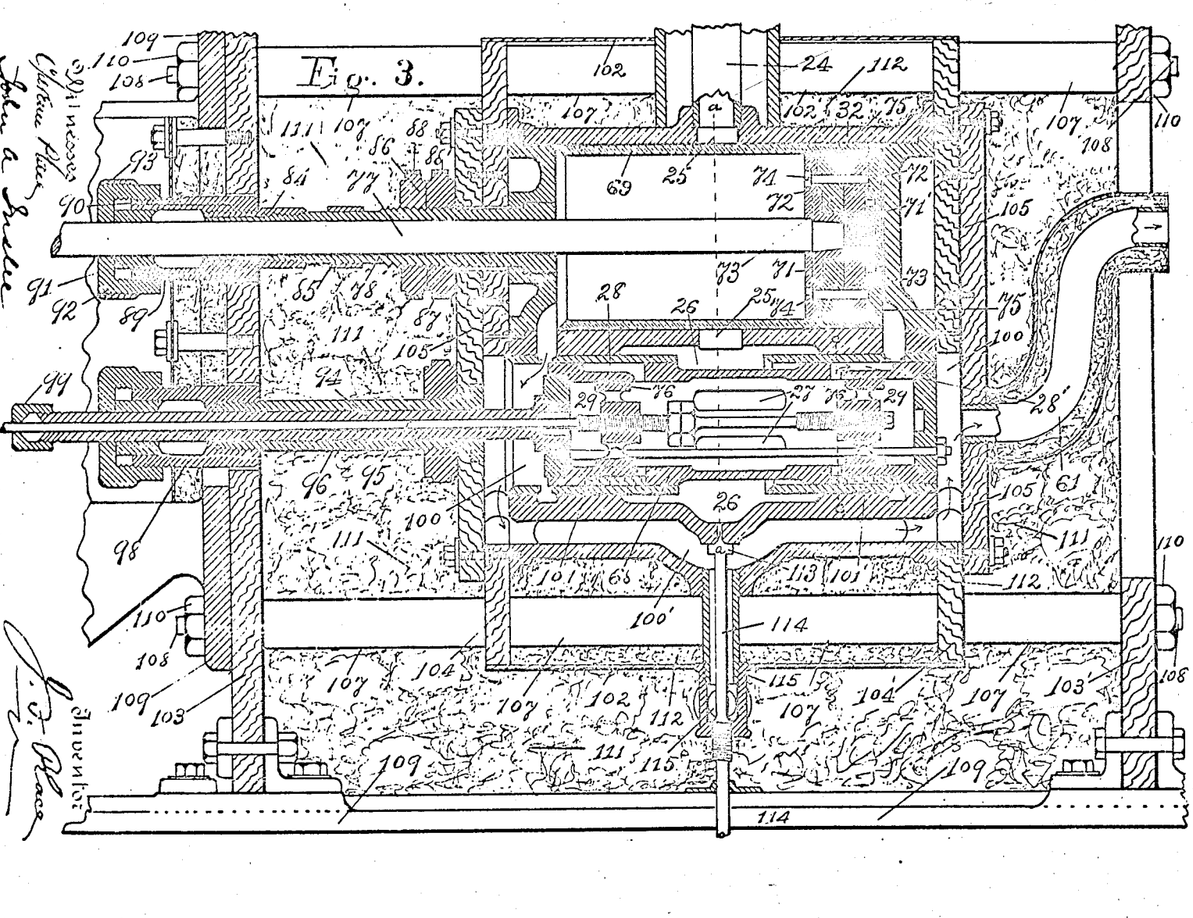
Fig. 3 is a longitudinal vertical section of my insulated air expansion engine, showing in detail the various parts.

The piston rod 77 is preferably made of steel, is very long as shown, so as to retard the conduction of heat from the outside through the same; and is insulated by the long sleeve 78 made of wood or fiber or some other material of low thermal conductivity, which is preferably reinforced by steel rings or ferrules 84 and 85, and the jam nuts 86 and 87, which are of wood or fiber reinforced by the metal mountings 88 and 88'. The outer ring or ferrule 84, carries the stuffing box 89, which is made of wood or fiber covered with bronze 90. The gland 91 and cap 92 are preferably made of wood, the latter being mounted with bronze 93. The piston rod insulating sleeve 78, passes through the insulations 111 against circumambient heat which envelop the engine, as shown in Fig. 3.

The stem 94 of the main valve is preferably of steel, very long as shown; and is made tubular, so as to carry in and through the same the cut-off stem 95. An insulating sleeve 96 incloses these valve stems and passes through the insulations 111 of the engine. On its outer end it carries a stuffing box 98, which is made of non-conducting material, same as the sleeve. The outer end of the main valve stem 94 also carries a stuffing box 99, around the cut-off stem (95), preferably made of steel.

The engine is supported by the main slabs or walls, partitions or end frames, 103 and 103', which are preferably made of hard wood or fiber, or other suitable material of low thermal conductivity, which are made fast as shown, to the iron bed (109) of engine. To the engine cylinder ends are bolted similar non-conducting plank ends 104 and 104', which are reinforced by the outer plank ends 105 and 105' of similar non-conducting material. Through the plank ends 104 and 104' are passed fiber tubes or hollow beams 106, which are inclosed by other similar tubes or hollow beams 107, the ends of which are forced against the sides of the structural frame, 103 and 103' and 104 and 104'; eight long steel rods or bolts 108, are passed through the non-conducting hollow beams 106, which firmly hold the plank frame supports 103 and 103' to the iron bed frame 109 by the nuts 110. It will be seen the engine is virtually suspended on the non-conducting hollow beams 106 by means of the side or plank ends 104 and 104'—thus being thoroughly insulated from all contact with the iron frame or bed; this insulation being further reinforced by the non-conducting frame 103 and 103', and the insulation of the bolts within the inner and outer hollow beams 106 and 107. The engine is then thoroughly insulated from the circumambient heat by the wool packing 111, completely enveloping the engine and the parts wherein the air is delivered to and from the same and expanded therein.

At 102 (see Fig. 3) I have a thin paper or canvas or other suitable partition, or inclosure fastened to and around the edges of the plank ends 104 and 104', and which passes all around the expansion engine, and to which is glued a covering of nickel foil or silver foil, having on the outer surface a high mirror-like polish. The outer flat surface of the non-conducting plank ends 104 and 104' and 105 and 105', are also covered with this highly polished nickel or silver foil. This polished partition or surface which completely surrounds the engine, serves to deflect outside radiant heat from the engine. Within this polished inclosure (102) I have the space filled with eider down or hares' fur (112) or other suitable packings of relatively very low thermal conductivity.

While I can liquefy a portion of the air expanded in the engine cylinder, I find it more advantageous to have a separate liquefier, and to use therein air compressed to a considerably higher tension. In this way I compress to from 40 to 45 atmospheres the air used in the liquefier—or to a compression above the critical pressure, which is about 39 atmospheres. It is a waste of energy in liquefying air to compress above about 45 atmospheres, for no amount of compression above the critical pressure (not even 1,000 atmospheres) will of itself produce liquefaction. A necessary condition precedent to liquefaction is a temperature at or below the critical temperature, −220° F. Another advantage of a separate liquefier, is the fact that the temperature of the air used in the engine does not have to be carried so low, and thus a lower initial temperature and lower initial pressure may be used, and a greater percentage of power is recovered from the air expanded. Besides, in using a separate liquefier all of the compressed air delivered to the liquefier may be liquefied; while in an expansion engine cylinder only about 20% of the air expanded can be liquefied under the most favorable conditions.

To recur to Fig. 1, at 30 I show a feed pipe supplied with compressed air at the same tension as used in the expansion engine and which is delivered to the high-tension air compressor (33), through the throttle valve 31. Air is taken at say 180 lbs. gage, and is compressed in the compressor 33 to about 45 atmospheres, or say 650 lbs. The heat of compression is then removed in the water cooler 34. At 35 I show a $CO_2$ compressor, with condenser 36, expansion valve 37 and expansion pipe 38 and coil 39, all of the ordinary type, except that I have arranged the pipe 38 and coil 39, in an original and novel manner, so as to get the best results in cooling of and freezing out the remaining moisture in the compressed air. The $CO_2$ liquid vaporizing or expansion pipe 38, I locate in an insulating casing or conduit 40, which is made of wood or paper or some other material of low thermal conductivity. The pipe 38 connects with the helical coil 39 at the bottom, which fills the remaining space in the drum 41, and thus forms the helical air passage 42. It will be seen that the highly compressed air as it leaves the cooler 34 passes through the pipe 43 into this helical passage 42, and down the same around the coil 39 in counter-current to the vaporizing $CO_2$ liquid therein, and thence enters the casing or conduit 40 and passes upwardly, still in counter-current to the vaporizing $CO_2$ liquid in the pipe 38. Any remaining moisture in the compressed air is thus frozen out and deposited as frost on the coils 39 and pipe 38, from which it can be melted by stopping the $CO_2$ compressor 35, and opening valve 44, and the water drained off through drain-pipe 45 on opening the cock 46. The discharge pipe 47 connects with the inlet pipe 47′ to the liquefier, (shown in Fig. 4). The air of high-tension, now thoroughly dry and free from $CO_2$ gas, now enters the liquefier shown in Fig. 4, and passes up through the helical copper coils 48 around the dead air drum 49 into the rope-twisted copper pipe 50, which forms a part of the liquefier, where it is ready for liquefaction, (see Figs. 4, 5 and 6). The lower end of this liquefying pipe 50 has a liquid releasing valve 51 operated by the non-conducting stem 52 and the hand wheel 53. In the preferred construction (shown in Fig. 5), I show the pipe 50 having at the end a suitably enlarged portion (54) to act as a holding reservoir, or condenser, which is submerged in liquid air in the vacuum jacketed evaporating low-pressure holder 55—which liquid (during the operation) is constantly replenished from the liquefying pipe 50 or drum 54, through the valve 51. The holder 55 being insulated by the vacuum 56, any heat of evaporation supplied to the liquid air in the holder (55) must be drawn from the high-tension air in the pipe 50 and 54, the latter being submerged therein. This high tension air will liquefy at its critical temperature −220° F., whereas the liquefied air in the holder 55, being released to atmospheric pressure, is at a constant temperature of −313°, or 93 degrees colder, thus insuring rapid withdrawal of heat from the highly compressed air in the submerged condenser 54.

Figure 2:
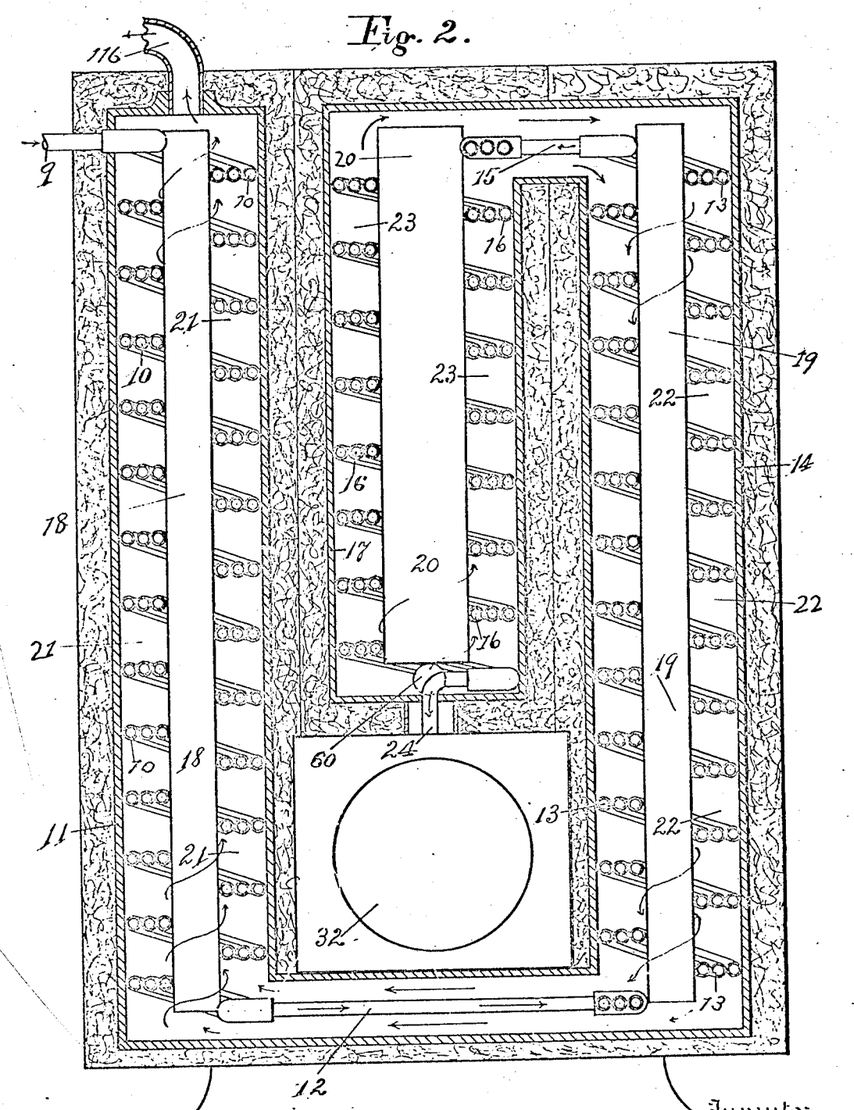
Fig. 2 is an end view of my expansion engine, and a view of the counter-current interchanger in transverse vertical section.
Figure 4:
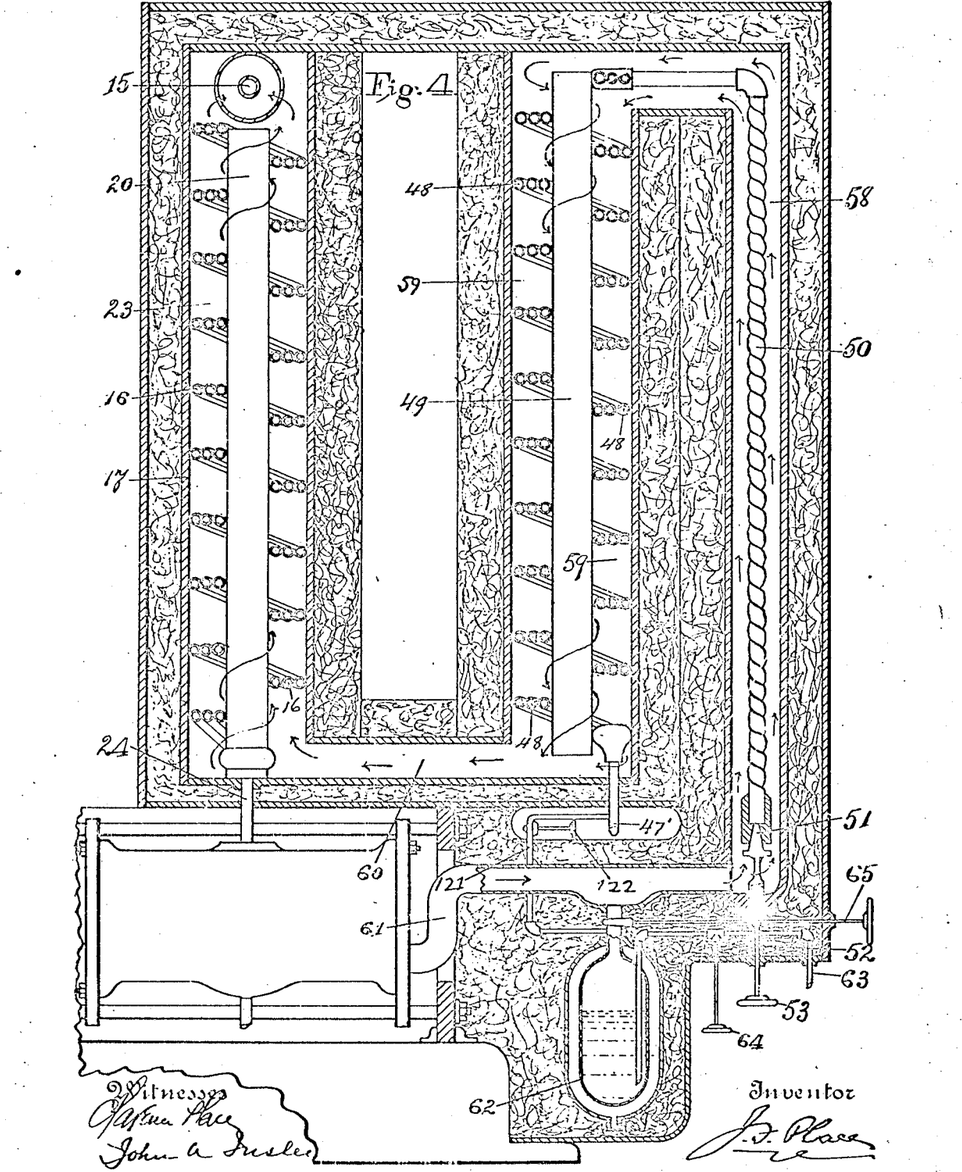
Fig. 4 is a longitudinal vertical section of my improved liquefier, and high-pressure interchanger.

All vapor from the liquid air evaporated in holder 55, is conserved as it passes up through the mouth of the holder 55, at 57, around, over and along the pipe 50, through the expanded air conduit 58, and its helical continuation of passage 59, and the connecting passage 60, and thence into the low-pressure or expanded air helical passages 23, 22 and 21 of the interchanger, successively, (see Figs. 2 and 4).

Figure 5:
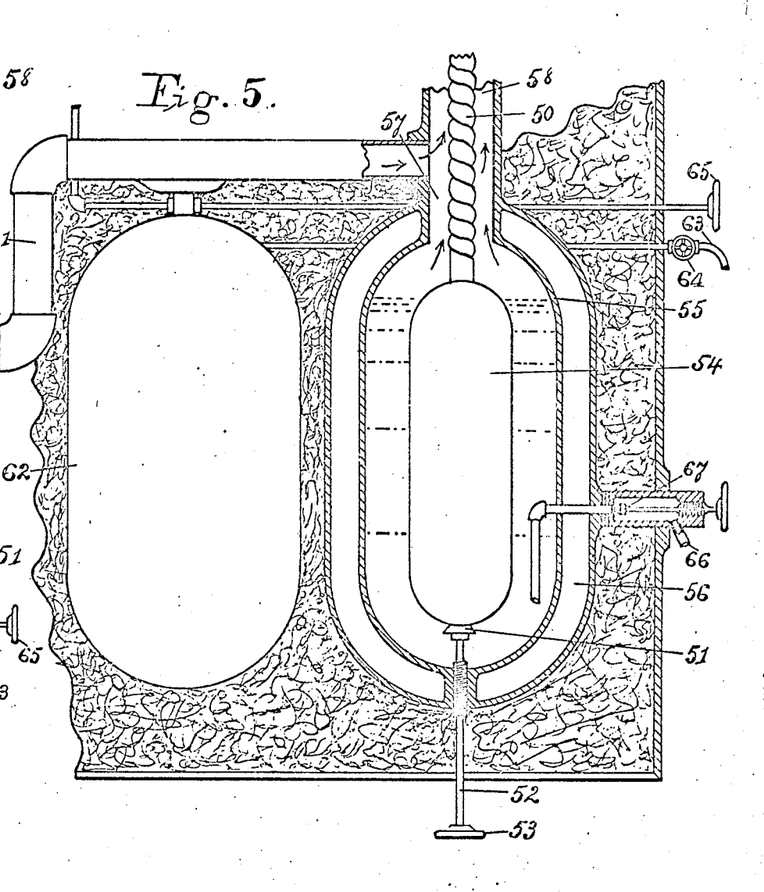
Fig. 5 is a modification in construction of my improved liquefier, showing in vertical section the preferred construction thereof.

At 61 (see Figs. 3, 4, 5 and 6) I show the exhaust or expanded and cold air conduit from the insulated expansion engine. This conduit is so arranged that it delivers first the cold expanded exhaust air from the engine to the liquefier—preferably to the pipe 50, above the liquid air holder as shown in Fig. 5. There, in passage 58 (see Figs. 4 and 5) it mixes with the cold vapor from the evaporating liquid air in the holder 55, and passes up the conduit 58 into the expanded air passage 59, 23, 22 and 21, over first the liquefier high tension feed pipe 50 and high-pressure supply coil 48 of the liquefier and thence into the interchanger over the engine feed pipe or coils 16, 13, 12, and 10 successively, and in counter-current thereto.

My exhaust or low-pressure conduit or passage 58, 59, 23, 22, and 21 of the counter-current interchanger (see Figs. 2 and 4) is used in common for cooling both the compressed air of high tension in the liquefier pipe 50, and coil 59: and the compressed air of less tension supplied to the engine in the coils 10, 13, and 16. This low-pressure or continuous conduit 58, 59, 23, 22, and 21 leaves the interchanger at 116 (see Fig. 2) and connects, if desired, with the suction of the main air-compressor (1) at 116′ (see Fig. 1). With the valve 117 closed and the valve 118 open the return flow of air from the engine exhaust conduit 61, and that which is vaporized from liquefied air in holder 55 or 55′ (see Figs. 5 and 6) will be delivered to the compressor 1 and be re-compressed; but with valve 117 open and valve 118 closed, the compressor will constantly take in all new air through the inlet 119, and the return flow will be discharged outside the apparatus through the valve 117. The cocks 120 and 120' are for the discharge of brine from the calcium chlorid drum 4, and the caustic potash drum 8, respectively.

At 62 I show a vacuum-jacketed liquid-air reservoir, with siphon discharge (63) operated by the cock 64, and the inlet valve 65. In the construction shown in Fig. 5, this tank 62 takes the overflow from the holder 55. The holder 55 is also provided with a siphon discharge 66 and insulated valve 67, located at a suitable distance above the bottom, so that a quantity of liquid will at all times remain in the holder. On closing the valve 65 and opening valve 64 (see Figs. 4 and 6) compressed air from pipe 47 may be admitted to the top of reservoir 62 through the pipe 121 by opening cock 122, and force out any liquid therein through the siphon 63.

Figure 6:
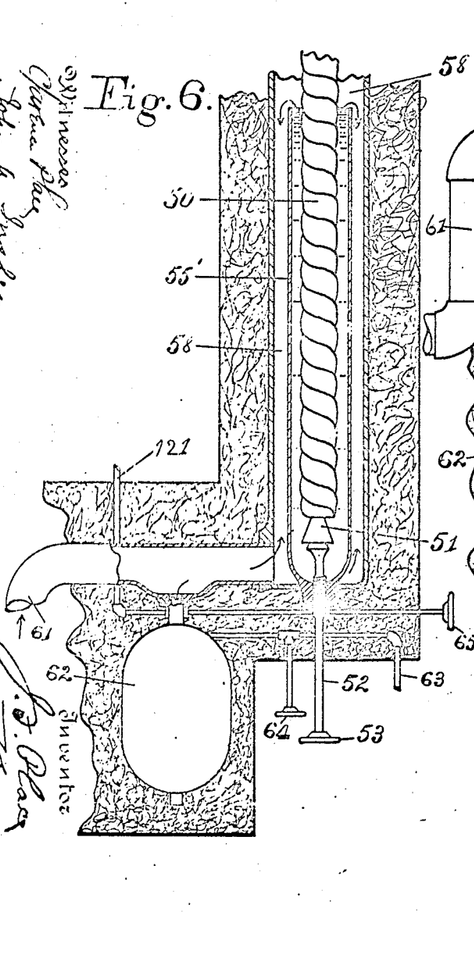
Fig. 6 is a modified form in vertical section of the liquefier shown in Fig. 4. Both the forms of liquefier shown in Figs. 5 and 6, are adapted for use with the pipes and connections shown in Fig. 4.

In Fig. 6, a modified form of holder 55 (referred to here as 55') is shown located within the passage or conduit 58, the overflow liquid air therefrom being delivered to said conduit, from which it is collected in the reservoir 62. At 113 I show a small valve, connecting the high-pressure air in the valve chamber 26 with the exhaust chamber 100', and arranged to open or close by the non-conducting stem 114 which passes through the insulations 111 and 112, whereby the high pressure air which may be liquefied in the port 25, or chamber 26, may be drained out into the exhaust chamber 100'; from thence, it may be drawn from the exhaust chamber by the low-pressure non-conducting liquid discharge pipe 115.

My improved cut-off valve (68) herein shown is especially adapted to a reciprocating air-expansion engine. It has been shown and described in detail only in order to more clearly explain my improved air-liquefying apparatus; no claim is made to the patentable features of said valve, as it is my purpose to file a separate application therefor.

No attempt has been made in the accompanying drawings to show the proper proportions of the pipes, conduits, or other parts; but only to show such parts of the invention relative to each other, so that the operation of the mechanism may be easily understood by one skilled in the art.

Power from an outside source may be supplied to the several compressors, by belts to wheels 80, 81, and 82 respectively; and the power of the expansion engine may be utilized by belting on to a counter-shaft (not here shown) and connecting same by belt with one of the air compressors.

It will be seen that I do not depend entirely upon the cold exhaust from the engine to continuously produce liquefaction of the air, but only in starting up. By having the air in the liquefier 50 or 54 at a tension at or above its critical pressure (which is about 39 atmospheres), then the air therein liquefies at or below its critical temperature, −220° F.; and after the expanded air exhausted from the engine (under the cumulative refrigerative effect of cooling lower and lower the incoming supply of compressed air thereto by the exhaust therefrom) has dropped to below −220° F., then the high-pressure air in coils 48 and pipe 50 commences to liquefy, and the liquid in pipe 50 falls by gravity to the lower end thereof and into the condenser 54 (see Fig. 5). When this condenser (or the liquefying pipe 50—see Fig. 6) is full, the liquid air therein may be discharged to the evaporating holder 55 or 55'. As this holder becomes filled the liquid air therein at substantially atmospheric pressure, evaporates rapidly and draws its latent heat of vaporization from the cooled compressed air in the now submerged condenser (50 or 54). Herein lies the great value of my system, for this latent heat required for vaporization (of the low-pressure liquid in the holder 55 or 55') is now about 120 B. t. u. per pound; whereas the latent heat of condensation given out by the air cooled to −220° F. and at 40 atmospheres compression, in the submerged condenser, is at zero or nil. Therefore the high-pressure air in the submerged air liquefying condenser, passes readily and rapidly from a gas to a liquid as fast as cooled to −220° F. without the evolution of any heat to neutralize refrigeration, and without reduction of pressure in the condenser. The liquid may then be sub-cooled to −313° F. before discharging it into the insulated evaporating holder 55, through the liquid-air discharging or pressure-releasing valve 51; so that when discharged through said valve to said holder or evaporating reservoir, no vaporization is required to reduce its temperature to the temperature of the low-pressure liquid air in said holder. All the vapor evaporated from the liquid in said holder is utilized—1st, to cool the supply of high-pressure air delivered to the submerged condenser in feed pipes 48 and 50; and 2nd, to cool the supply of compressed air delivered to the engine in pipes 16, 13 and 10.

It will be found by a computation of the refrigerative effect produced, that once the system is properly cooled by the expanded exhaust air from the engine, and the low-pressure liquid-air evaporating holder 55 is fully charged with liquid air produced thereby, from the high-pressure condenser, then every pound of liquid thereafter evaporated in said holder at substantially atmospheric pressure, will produce fully two pounds of liquid air in the high-pressure submerged condenser 54, (so long as said condenser is kept supplied with air compressed to 40 or more atmospheres) and without requiring any refrigerating help from the engine;—the output of the liquefier when cooled and charged and operated alone, or amount of liquid air drawn from the apparatus through the siphon discharge tube 66, being equal to that vaporized in the insulated holder 55, or about 50% of all the air supplied to the liquefier. In fact, continuous running of the engine thereafter is more a matter of economy or capacity of the apparatus for the production of liquid air, than for refrigerative effect.

Wherever the words "insulation," "insulated" or "insulating" occur herein, they refer to insulation of the parts against the inflow thereto of circumambient heat. The word engine as used herein, refers to the expansion cylinder, valves, etc., as shown in Fig. 3, and not to the crank, bed, etc., unless so specially specified.

The features of my invention shown in Figs. 3, 7, 8 and 9, relating to the details of my improved insulated refrigerating engine for producing low temperatures, which I use in combination with my improved submerged liquefier and counter-current system as herein shown and described, I reserve for a future application for a patent thereon.

Having thus described my invention, what I claim as new and original and desire to secure by Letters Patent, is—

1. In an air liquefying apparatus the combination of an insulated expansion engine, a high pressure liquefier, and a double counter-current interchanger having two separate high pressure conduits and a low-pressure cold air exhaust conduit common to both; one of said high-pressure conduits delivering to said engine and the other to said liquefier; and means for supplying compressed air for expanding in the engine to the first and compressed air of considerably higher tension to the other.

2. An air liquefying apparatus, comprising an expansion engine and a liquefier—both insulated against circumambient heat—each having a feed pipe connected therewith; an exhaust conduit from said engine, arranged to pass the cold exhaust air therefrom over both of said feed pipes; and means for supplying compressed air to said engine feed pipe and compressed air of a higher tension to said liquefier feed pipe.

3. An air liquefying apparatus, comprising an expansion engine and a liquefier, each having a feed pipe connected therewith; an exhaust conduit from said engine, arranged so as to pass the cold expanded air therefrom successively over first the liquefier and then the engine feed pipes; and means for supplying compressed air to said engine feed pipe, and compressed air of a higher tension to said liquefier feed pipe.

4. Air-liquefying mechanism comprising in operative combination, an air-expansion engine having a compressed air feed pipe and an exhaust or expanded air conduit; and a liquefier consisting of a separate high-pressure compressed air feed pipe, provided with a liquid air releasing valve at its lower end inclosed by a low-pressure liquid-air evaporating holder open at its upper end—the parts being so arranged that when in operation the cold expanded air exhausted from the engine is conducted over the outside of said liquefier compressed air feed pipe, and that the lower end of said pipe is submerged in the low-pressure liquid air in said holder.

5. Mechanism for liquefying atmospheric air, comprising in operative combination, a liquid air holder or evaporating receptacle, arranged to be charged with liquid air of low pressure; a high-pressure liquefier located within said liquid air receptacle, and having a compressed air supply pipe; and an air expanding engine, arranged to pass the cold expanded air exhausted therefrom, over said supply pipe.

6. Mechanism for liquefying atmospheric air, comprising a liquid air holder or receptacle, arranged to be charged with liquid air of low pressure; a high-pressure liquefier located within said liquid air receptacle, and having a compressed air supply pipe; and an air expanding engine, arranged to pass the cold expanded air exhausted therefrom, over said supply pipe; in combination with means for supplying compressed air to said engine, and compressed air of higher tension to said liquefier.

7. An apparatus for liquefying atmospheric air, comprising an air-expanding engine having an insulated exhaust conduit; a low-pressure liquid air receptacle or holder opening to said conduit; and a liquefier within said holder, having a high-pressure compressed air supply pipe—said liquefier being arranged to be submerged in the low-pressure liquid air in said holder.

8. An apparatus for liquefying atmospheric air, comprising a high-pressure liquefier; and an air-expanding engine arranged to conduct the cold expanded air exhausted therefrom to and over said liquefier; and means for supplying to said liquefier compressed air at or above substantially its critical pressure, and to said engine compressed air at considerably less pressure.

9. Air-liquefying mechanism comprising in operative combination, an air-expanding engine having an expanded air exhaust conduit; and a liquefier—each having distinct compressed air feed pipes; said liquefier consisting of a pipe or pipes arranged to be supplied with compressed air at one end and having a liquid-air releasing valve at the other or lower end, inclosed by a low-pressure liquid-air evaporating receptacle o nected with said engine exhaust conduit—the parts being so arranged that the lower end of said liquefier pipe is submerged in the liquid air of substantially atmospheric pressure as the same is delivered from said valve to said receptacle.

10. Air-liquefying mechanism comprising in operative combination an air-expansion engine having a compressed air feed pipe, and an exhaust or expanded air conduit; and a liquefier consisting of a separate high-pressure compressed air feed pipe provided with a liquid air releasing valve at its lower end, inclosed by a low-pressure liquid-air evaporating holder open at its upper end and connected with said engine exhaust or expanded air conduit;—the parts being so arranged that when in operation only liquid air can pass through said valve, and that the lower end of said liquefier high-pressure feed pipe is constantly submerged in the liquid air released from pressure and delivered to said holder through said valve; and that as said liquid air or portions thereof evaporate in said holder the vapor therefrom passes over said liquefier high-pressure feed pipe.

11. An apparatus for liquefying atmospheric air, comprising in operative combination, an air-expansion engine, arranged to expand compressed air against resistance therein; a counter-current heat interchanger, arranged to cool the compressed air supplied to said engine by the expanded air exhausted therefrom; and a high-pressure liquefier,—the parts being arranged to pass the expanded exhaust air from said engine, first over said liquefier and then through said interchanger.

12. An apparatus for liquefying atmospheric air, comprising in operative combination, an air-expanding engine; a low-pressure liquid air vessel or holder; a low-pressure conduit connected with said engine and with said holder; and a high-pressure pipe within said conduit, said high-pressure pipe having a high-pressure liquefier at one end located within said liquid air holder.

13. An apparatus for liquefying atmospheric air, comprising in operative combination, an air-expansion engine; a low-pressure liquid air vessel or holder; a low-pressure conduit connected with said engine and with said holder; and a high-pressure pipe within said conduit, said high-pressure pipe having a high-pressure liquefier at one end located within said liquid air holder, and connected by a liquid-discharging valve with said low-pressure holder.

14. Mechanism for liquefying atmospheric air, comprising in operative combination, a liquid air holder or receptacle, arranged to be charged with liquid air of low pressure; a high-pressure liquefier having a compressed air supply pipe at one end and a liquid air discharging valve at its other end; and an air expanding engine, arranged to pass the cold expanded air exhausted therefrom, over said supply pipe; said liquefier being arranged to be submerged in the low-pressure liquid air in said liquid air vessel.

15. An apparatus for liquefying air, comprising a low-pressure liquid-air evaporating holder; a high-pressure air-liquefying condenser provided with a valved outlet for the withdrawal of liquefied air therefrom, to said low-pressure holder, and arranged to be submerged in a charge of low-pressure liquid air in said holder previously produced or liquefied at high-pressure in said condenser; in combination with an insulated air-expansion engine; and means for subjecting the compressed air about to be delivered to and liquefied in said condenser to the cooling effect of the cold expanded exhaust air from said engine.

16. An apparatus for liquefying air, comprising in operative combination an insulated air-expansion engine, for expanding therein compressed air against external resistance; an insulated counter-current thermal interchanger, arranged to cool the compressed air supplied to said engine by the cold expanded air exhausted therefrom; an air-liquefying high-pressure condenser having a compressed-air supply pipe connected with and delivering thereto; said condenser being provided with means for the withdrawal of liquefied air therefrom—the parts being arranged to pass said cold expanded air exhausted from the engine first over said condenser supply pipe and then through said interchanger.

17. An apparatus for liquefying atmospheric air, comprising in operative combination, an air-liquefying high-pressure condenser, having a compressed-air supply pipe; said condenser being provided with means for the withdrawal of liquefied air therefrom; and an insulated air-expansion engine having a compressed-air supply pipe, and arranged to pass the cold expanded air exhausted therefrom first over said condenser supply pipe and then over said engine supply pipe.

18. An apparatus for liquefying atmospheric air, comprising in operative combination, an air-liquefying high-pressure condenser, having a compressed-air supply pipe—said condenser being provided with means for the withdrawal of liquefied air therefrom; and an insulated air-expansion engine, arranged to pass the cold expanded air exhausted therefrom over said supply pipe; and means for supplying compressed air to said engine, and compressed air of higher tension to said condenser.

19. An apparatus for liquefying atmospheric air, comprising in operative combination, an insulated air-expansion engine, having an exhaust conduit; a liquid air evaporating vessel, opening to said conduit; and an air-liquefying condenser having a liquid-air discharging valve at or near the bottom thereof delivering to said vessel—said condenser being arranged to be submerged in low-pressure liquid air in said vessel which was previously produced or liquefied at a much higher tension in said condenser by the cold expanded air exhausted from said engine.

20. An apparatus for liquefying atmospheric air, comprising in operative combination, an insulated air-expansion engine, having an exhaust conduit; a liquid air evaporating vessel, opening to said conduit; and an air-liquefying condenser having a liquid-air discharging valve at or near the bottom thereof delivering to said vessel—said condenser being arranged to be submerged in low-pressure liquid air in said vessel which was previously produced or liquefied at a much higher tension in said condenser by the cold expanded air exhausted from said engine: and means for supplying compressed air to said engine, and compressed air of higher tension to said condenser.

21. An apparatus for liquefying atmospheric air, comprising an air-expanding engine, having an insulated exhaust conduit; a low-pressure liquid-air receptacle or container, opening to said conduit; an air-liquefier within said receptacle, having a high-pressure compressed-air supply pipe; and means for releasing the liquefied air from said liquefier to said container, and thereby submerging said liquefier, partially or completely, in low-pressure liquid air in said receptacle.

22. In an apparatus for liquefying atmospheric air, the combination of an insulated air-expansion engine; an insulated low-pressure liquid-air evaporating vessel; an air-liquefying condenser or liquefier within said vessel, having a high-pressure compressed-air supply pipe; and means for conducting the cold expanded exhaust air from said engine to said liquefier high-pressure compressed-air supply pipe, and passing it back over the same.

23. An apparatus for liquefying air, comprising in operative combination, an insulated air-expanding engine; a compressed-air-liquefying condenser; a double counter-current thermal interchanger, consisting of two separate compressed-air conduits inclosed by an outwardly-delivering insulated expanded-air conduit common to both and arranged to receive the exhaust air from said engine—one of said compressed-air conduits delivering to said engine and the other to said condenser.

24. An air-liquefying apparatus, comprising in operative combination an insulated air-expanding engine and a compressed-air-liquefying condenser—each having a compressed-air feed pipe connected therewith and delivering respectively thereto; and an insulated expanded air exhaust conduit from said engine, arranged to conduct the cold expanded air therefrom outwardly and successively over first the said condenser feed pipe and then the said engine feed pipe.

25. An apparatus for liquefying atmospheric air, comprising in operative combination, an insulated air-expansion engine; an insulated counter-current thermal interchanger connected with and arranged to cool the compressed air supplied to said engine by the cold expanded air exhausted therefrom; an insulated low-pressure liquid-air evaporating vessel or holder connected with and delivering to said interchanger; and a high-pressure air-liquefying condenser within said holder, provided with means for withdrawing air therefrom after the liquefaction thereof.

26. An apparatus for liquefying atmospheric air, comprising in operative combination, an insulated air-expansion engine, having an expanded air insulated exhaust conduit; an insulated low-pressure liquid-air evaporating holder connected with said conduit; a high-pressure air-liquefying condenser within said holder, provided with means for discharging the liquefied air therein to said low-pressure holder; and a high-pressure compressed-air supply pipe within said exhaust conduit, and connected with said air-liquefying condenser.

27. An apparatus for liquefying atmospheric air, comprising in operative combination, an insulated air-expansion engine, having an insulated expanded-air exhaust conduit; an insulated low-pressure liquid-air evaporating holder; a high-pressure air-liquefying condenser, provided with a valved outlet for the withdrawal of liquefied air therefrom, and arranged to be submerged in the liquid air in said holder; and a high-pressure compressed-air supply pipe, within said exhaust conduit, connected at its delivery end with said condenser.

28. The combination in an air-liquefying apparatus, of an insulated liquid-air evaporating vessel or holder, arranged to be charged with liquid air at substantially atmospheric pressure; a high-pressure air-liquefying condenser; a high-pressure compressed-air supply pipe, connected at its delivery end with said condenser—said condenser being arranged to be submerged in liquid air of low-pressure previously liquefied at high pressure therein; and an insulated air-expansion engine, arranged to pass the cold expanded air exhausted therefrom outwardly over and along said compressed-air supply pipe; and a liquid air pressure-releasing valve, connecting said high-pressure condenser with said low-pressure liquid-air evaporating holder.

29. An apparatus for liquefying atmospheric air, comprising in operative combination, an insulated air-expansion engine; a counter-current thermal interchanger arranged to cool the compressed air supplied to said engine by the expanded air exhausted therefrom; and an air-liquefying high-pressure liquefier, having means for the withdrawal of liquefied air therefrom—the parts being arranged to pass said cold expanded exhaust air from the engine first over said liquefier, and then through said interchanger; and means for supplying compressed air to said engine, and compressed air of higher tension to said liquefier.

30. An apparatus for liquefying atmospheric air, comprising in operative combination, an insulated air-expansion engine having a low-pressure expanded air conduit; a low-pressure liquid air evaporating vessel or holder opening to said conduit; and a high-pressure pipe within said conduit, said high-pressure pipe having an air-liquefying high-pressure condenser at its lower end located within said liquid-air evaporating holder, and having means for the withdrawal of liquefied air therefrom and delivering same to said holder.

31. An apparatus for liquefying atmospheric air, comprising in operative combination, an insulated air-expansion engine, connected with a low-pressure expanded air conduit; a low-pressure liquid-air evaporating vessel or holder, opening to said conduit; and a high-pressure pipe within said conduit, said high-pressure pipe having an air-liquefying high-pressure condenser at its lower end located within said liquid-air evaporating holder, and having means for the withdrawal of liquefied air therefrom; and means for supplying compressed air to said engine, and compressed air of higher tension to said condenser.

32. In an apparatus for liquefying atmospheric air or other similar gases, the combination of means for compressing gas to and maintaining it at a relatively high pressure; and means for compressing other portions of gas to a lower pressure and then expanding the same, and means for utilizing this cold expanded gas to liquefy the said gas at the relatively high pressure.

33. An apparatus for liquefying atmospheric air, comprising in operative combination, an insulated air-expansion engine; a counter-current thermal interchanger; an exhaust conduit from said engine to said interchanger; an insulated liquid-air evaporating vessel or holder, opening to said conduit; and an air-liquefying high-pressure liquefier located within said liquid-air evaporating holder, having means for the withdrawal of liquefied air therefrom to said holder; means for supplying compressed air to said engine; and means for supplying compressed air of higher tension to said liquefier.

34. An apparatus for liquefying air, comprising a counter-current thermal interchanger, and a high pressure liquefier; and means for supplying said liquefier with compressed air through said interchanger of relatively high tension; in combination with an insulated air-expanding engine having an exhaust conduit leading to said interchanger; and means for supplying said engine with compressed air of less tension.

35. An apparatus for liquefying air comprising a high-pressure liquefier, and means for supplying it with compressed air of relatively high tension; in combination with an insulated air-expanding engine, and means for supplying it with compressed air of less tension; and means for utilizing the exhaust air therefrom to cool the high tension air supplied to said liquefier.

36. In an apparatus for liquefying atmospheric air, the combination of an air-expanding engine and a liquefier, with means for supplying said engine and said liquefier with compressed air; means for utilizing the cold expanded air from said engine to liquefy the compressed air being delivered to said liquefier; means for releasing therefrom the air in said liquefier after liquefaction thereof; and means for retaining in contact with said liquefier the liquefied air released therefrom.

37. An apparatus for liquefying air, comprising a high-pressure liquefier, and means for supplying it with air compressed to a relatively high tension; in combination with an air-expanding engine, and means for supplying it with compressed air of less tension; means for utilizing the cold exhaust air from said engine to liquefy the compressed air of relatively high tension being delivered to said liquefier; means for releasing therefrom the air in said liquefier after liquefaction thereof; and means for retaining in contact with said liquefier the liquefied air released therefrom.

Signed at Norwich in the county of New London and State of Connecticut this 22nd day of August A. D. 1906.

JAMES F. PLACE.

Witnesses:
CLARENCE PLACE,
JOHN A. INSLEE.